Patented June 14, 1927.

1,632,113

UNITED STATES PATENT OFFICE.

ARTHUR L. BROWN, OF WILKINSBURG, PENNSYLVANIA, ASSIGNOR TO WESTINGHOUSE ELECTRIC AND MANUFACTURING COMPANY, A CORPORATION OF PENNSYLVANIA.

PHENOLIC CONDENSATION PRODUCT.

No Drawing. Application filed April 7, 1922. Serial No. 550,516.

This invention relates to condensation products, more particularly to a new composition of this type and a method of making the same.

In my copending application, Serial No. 412,564, filed September 24, 1920, I have described a condensation product comprising the product of reaction of a phenolic body, formaldehyde or its equivalent, China wood oil or a similar oil and a drier, such as "tox tungate" solid. This material has properties which render it particularly useful for making plates which are to be punched to desired forms.

I have further discovered that the process described in the above-identified application may be modified and simplified by omitting the "tox tungate" and causing the reaction to proceed by means of the catalyzing action of the fatty acids in the China wood oil. This modification is described in my copending application, Serial No. 538,748, filed Feb. 23, 1922.

The present invention is directed to a still further modification of the inventions set forth in the above-mentioned applications, it being among the objects thereof to provide an improved condensation product and a method of making the same which shall be simple and effective.

I have found that a drier, such as "tox tungate" solid, which consists of a mixture of lead and manganese resinates and tungates, is capable of exercising a catalyzing action upon the reaction of cresol or phenol and formaldehyde or the equivalents thereof to produce condensation products which are soluble and fusible and which may be converted into insoluble and infusible compounds when subjected to heat and pressure. The "tox tungate", although chemically a salt, has a slightly acid reaction, and I believe that the ability thereof to accelerate the condensation reaction is due to its acid character.

In practising my invention, I utilize a phenolic body, such as phenol, cresol, or the like and dissolve a suitable amount of "tox tungate" solid therein. A substance having an active methylene group, such as formaldehyde is added to the solution, and the mixture is heated until the condensation reaction has proceeded to the desired point. The product thus formed may be utilized as is well known in the art.

Although various methods of making my new condensation product are available, I prefer to make the same in the following manner.

Four parts by weight of cresol and one-tenth of one part by weight of "tox tungate" solid are mixed and heated to 115° C. until solution is complete. Three parts by weight of a 40% solution of formaldehyde are heated to boiling in a vacuum kettle having a reflux condenser attached thereto. The solution of cresol and drier is poured into the vacuum kettle by means of a pipe connection thereto. A temperature of 93°-98° C. is maintained for about 50 minutes to cause the reaction of condensation to proceed. The condenser is then disconnected and a vacuum applied while maintaining a temperature not over 97°-98° C. to vaporize the water and the excess of formaldehyde.

The condensation product is then transferred to an enameled, open kettle and the temperature thereof is maintained at about 100° C. until the material, when at ordinary room temperature, is solid. This condition may be determined by cooling a drop of the product on a glass slide. The material is then dissolved in a sufficient amount of a mixture of benzol and alcohol to obtain the desired consistency for impregnation of fabric, paper or the like.

Although I have described my invention setting forth certain proportions of ingredients and details of manipulation, it is obvious that various changes may be made in the details of my invention within the scope thereof. For instance, in place of the ingredients stated, the well known equivalents thereof may be used to produce the condensation product. I am not limited to the use of "tox tungate" as a catalyzer for the reaction, but other driers having the condensing properties of "tox tungate" may be substituted therefor.

I claim as my invention:

1. A condensation product consisting of a compound of cresol, formaldehyde and a drier, said drier including a basic inorganic radical and an organic acid radical of high molecular weight of the class derived from animal and vegetable fats and resinates and having the condensing properties of "tox-tungate".

2. A condensation product consisting of a compound of cresol, formaldehyde and a drier comprising salts of fatty and resin acids.

3. A condensation product consisting of a compound of cresol, formaldehyde and a drier comprising lead-manganese salts of fatty and resin acids.

4. A condensation product consisting of a compound of cresol, formaldehyde and a drier comprising "tox tungate".

5. A method of making condensation products which comprises dissolving a drier in cresol, mixing formaldehyde therewith and heating to cause said ingredients to react, said drier having the condensing properties of "tox tungate".

6. A method of making condensation products which comprises dissolving "tox tungate" in cresol, mixing formaldehyde therewith and heating to cause said ingredients to react.

7. A condensation product resulting from reacting a phenol, a substance containing an active methylene group and a drier, said drier including a basic inorganic radical and an organic acid radical of high molecular weight of the class derived from animal and vegetable fats and resinates and having the condensing properties of "tox-tungate".

In testimony whereof, I have hereunto subscribed my name this 31st day of March 1922.

ARTHUR L. BROWN.